United States Patent [19]

Barnard et al.

[11] 4,350,887
[45] Sep. 21, 1982

[54] METHOD OF ASSAYING URANIUM WITH PROMPT FISSION AND THERMAL NEUTRON BOREHOLE LOGGING ADJUSTED BY BOREHOLE PHYSICAL CHARACTERISTICS

[75] Inventors: Ralston W. Barnard; Dal H. Jensen, both of Albuquerque, N. Mex.

[73] Assignee: The United States of America as represented by the United States Department of Energy, Washington, D.C.

[21] Appl. No.: 204,721

[22] Filed: Nov. 5, 1980

[51] Int. Cl.³ .............................................. G01J 5/00
[52] U.S. Cl. ..................................... 250/265; 250/269
[58] Field of Search ................................. 250/265, 269

[56] References Cited

U.S. PATENT DOCUMENTS

| | | |
|---|---|---|
| 2,930,204 | 1/1960 | Youmans . |
| 2,991,364 | 7/1961 | Goodman . |
| 3,385,969 | 5/1968 | Nelligan . |
| 4,097,737 | 6/1978 | Mills .................................... 250/269 |
| 4,180,730 | 12/1979 | Givens et al. ....................... 250/269 |
| 4,209,695 | 6/1980 | Arnold . |
| 4,224,516 | 9/1980 | Johnstone .......................... 250/269 |
| 4,266,126 | 5/1981 | Mills .................................... 250/269 |
| 4,283,624 | 8/1981 | Mills .................................... 250/269 |

OTHER PUBLICATIONS

Sand 77-0300, Report from The Sandia Laboratories, Feb. '77, "Seminar Proceedings".

Primary Examiner—Bruce C. Anderson
Attorney, Agent, or Firm—George H. Libman; Albert Sopp; Richard G. Besha

[57] ABSTRACT

Uranium formations are assayed by prompt fission neutron logging techniques. The uranium in the formation is proportional to the ratio of epithermal counts to thermal or eqithermal dieaway. Various calibration factors enhance the accuracy of the measurement.

4 Claims, 7 Drawing Figures

METHOD OF ASSAYING URANIUM WITH PROMPT FISSION AND THERMAL NEUTRON BOREHOLE LOGGING ADJUSTED BY BOREHOLE PHYSICAL CHARACTERISTICS

The U.S. Government has rights in this invention pursuant to Contract No. DE-AC04-76DP00789 and modifications between the U.S. Department of Energy and Western Electric Company, Incorporated.

BACKGROUND OF THE INVENTION

This invention is in the area of assaying uranium in formations traversed by a borehole. In particular, the invention relates to a method for improved uranium assay employing data from prompt fission neutron borehole logging, data from the measurement of formation density and data from other formation characteristics.

In the art of assaying earth formations for uranium deposits, several methods have been utilized. The most direct, time consuming, expensive and accurate method is to obtain a core of the earth formation and subject it to a laboratory analysis.

In order to decrease the time and expanse involved in obtaining a uranium assay, nuclear methods have been utilized in a borehole traversing the formation. One early method measures the natural gamma radiation in the borehole emitted by uranium decay products in the formation. This method is subject to many interferences and is not relied upon by industry for quantitative data.

Alternative logging techniques have been developed to obtain more reliable assay data. An analysis presented in a paper by Jan A. Czubek entitled "Pulsed Neutron Method for Uranium Well Logging," *Geophysics*, Volume 37, No. 1, February 1972, pages 160–173, disclosed that when a formation containing a uranium ore is irradiated with fast (14 MeV) neutrons, the formation moderates the fast neutrons to become thermal (less than 0.4 eV) neutrons. This thermal neutron flux induces fission in $^{235}U$, producing more neutrons with a fission spectrum that are designated as prompt fission neutrons (PFN). These neutrons may be measured when their energy is in the epithermal range. The amplitude of the epithermal neutron flux was stated to be proportional to the uranium concentration in the ore.

The Czubek model assumed an isotropic point source of neutrons, spherically symmetric geometry, a uniform matrix of uranium in the host formation, and a coincident source and detector. The expression for the response of a detect or of epithermal neutrons, $R_\epsilon$ is $$R_\epsilon = gkQ_n h_d t_s \rho / (\Sigma_A)^2$$

where g is the amount of uranium (expressed as percent by weight), k is a collection of physical constants, $Q_n$ is a function of the neutron source output distribution, $h_d$ is a function of the neutron detector characteristics, $\rho$ is the formation density, $\Sigma_A$ is the formation macroscopic thermal absorption cross section, and $t_s$ is the slowing-down time for neutrons of 14 MeV energy to epithermal energies. The Czubek relationship for the response of a thermal detector under the same assumptions is given by $$R_\theta = k' h'_d Q_n / (\Sigma_A)^2 + \ldots,$$

where the primed quantities are analogous to those defined above.

Initial attempts at log interpretation consisted of applying the Gzubek expression for $R_\epsilon$ to PFN data. Formation properties and probe operating properties such as detector characteristics, neutron generator output, etc. were estimated. These results were not satisfactory, with the grade implied by the calculated detector response being much less than the actual uranium grade, because the estimates of probe characteristics were not very accurate.

In an article entitled "Prediction of Time Dependent Neutron Fluxes Encountered In Pulsed Neutron Uranium Logging Experiments" in *Nuclear Technology*, Volume 31, page 133 (Oct. 1976), J. Renken suggested that a ratio of epithermal to thermal neutron fluxes should be less sensitive to trace neutron absorbers that affect direct PFN measurement. Calculations to substantiate this suggestion were published at page 119 of *Transactions of the American Nuclear Society*, 1976 International Meeting, November 14–19, 1976 by J. H. Renken entitled "Minimization of Neutron-Absorber Effects In Pulsed-Neutron Uranium Logging." One of the rationales behind this model can be seen from the fact that Czubek's thermal detector response would have many of the same uncertainties in probe characteristics which made application of the epithermal response formula unsuccessful. Consequently, the ratio of the two responses would cancel out many of these factors. This technique is callwed the "counts ratio" model.

The hardware utilized in the application of this model is described in detail in Sandia Laboratories energy report SAND77-0300, February 1977 (available from DOE Technical Information Center, P.O. Box 62, Oak Ridge, Tennessee 30830). Much of this hardware is also used in the present invention.

The counts ratio model was calibrated using the gamma ray calibration uranium test pits at the USDOE facility in Grand Junction, Colorado. However, on field data it produced inconsistent results. One of the reasons offered for the inconsistency of the counts ratio model was that the "thermal neutron" response being detected was actually gamma rays produced from the $^{28}Si(n,\gamma)$ thermal neutron capture reaction. The number of gammas so detected could vary with the content of silicon or other high-energy gamma ray emitters in the formation. These variations in the gamma ray production cause variations in the ratio that are not due to uranium concentration changes.

In U.S. Pat. No. 4,180,730 of Givens at al, a method of assaying for uranium in formations traversed by a borehole is disclosed and claimed in which the formation of interest is cylically irradiated by bursts of fast neutrons; the thermal and epithermal neutron fluxes measured during a time period when they are expected to be detected; and a ratio of the measurements of the thermal and epithermal neutron fluxes developed to give an indication of the concentration of uranium.

Givens employs analog measurement of the epithermal neutron counts and thermal neutron counts and uses analog techniques to obtain the ratio. The patent discloses the cyclic pulse rate of the neutron generator to be 1,000 pulses per second, leaving a spacing between each pulse of only one millisecond. Because this cyclic neutron pulse rate is so rapid, thermal neutron counts do not have sufficient time to return to background levels between pulses.

It has been discovered that knowledge of borehole size and earth formation factors is important for obtaining accurate uranium assay information using prompt fission neutron borehole logging. In particular, the point-by-point variations in the diameter of the borehole and point-by-point variations in earth formation factors, such as density and moisture content, are significant factors in obtaining accurate uranium assay information. Previously, these factors have been simply ignored or roughly averaged, thus compromising the accuracy of the results.

U.S. Pat. No. 4,209,694 to Mills disclosed a new logging procedure designwed to account for inaccuracies in Givens' patented ratio technique. This procedure involves logging a series of test holes having known concentrations of uranium ore and borehole diameter, taking the ratio of epithermal to thermal fluxes therein and using regression analysis to determine a correction factor that may be used to account for borehole effects from a field measurement.

SUMMARY OF THE INVENTION

It is an object of the invention to provide a neutron borehole logging method for obtaining uranium assay information utilizing epithermal or thermal neutron count dieaway in a ratio with epithermal neutron counts integrated over an analysis window, where dieaway is the characteristic mean lifetime of the exponential decay of the neutron populations arising from cyclical neutron irradiation of the formation.

Another object of the invention is to provide an improved method for assaying uranium using neutron borehole logging whereby factors relating to borehole diameter and formation density and moisture content are accurately taken into consideration.

It is another object of the invention to provide a method wherein data from neutron borehole logging, utilizing epithermal neutron counts and thermal neutron dieaway in a ratio, are merged with physical properties of the borehole to yield highly accurate assay information.

Additional objects, advantages and other features of the invention will be set forth in part in the description which follows and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as described herein, a neutron logging method is described for obtaining accurate uranium assay versus depth information for each logging point in neutron borehole logging. The method may take into consideration such factors as borehole diameter, formation density, and moisture content on a point-by-point basis in the borehole. Preferably, the formation is subjected to PFN borehole logging which provides a ratio of epithermal neutron counts to thermal neutron dieaway. Unlike Givens et al, neutron bursts from the neutron generator are spaced sufficiently far apart in time to allow thermal neutron counts to return to background levels between successive pulses. For each logging point a ratio of epithermal neutron counts to thermal neutron count dieaway is derived. Uranium assay versus depth information is obtained by computations performed on the ratio for each logging point. Although this basic method is useful, further accuracy is achieved by adding correction factors derived from the physical parameters of the borehole and formation.

In summary, employing the method of the invention, numerous benefits and advantages are obtained. By taking into consideration borehole diameter and formation density and moisture content on a point-by-point basis in the borehole, more accurate uranium assay versus depth information is obtained from neutron borehole logging. By obtaining thermal or epithermal dieaway data, uranium assay versus depth information is obtained with near insensitivity to variations in formation porosity and associated moisture content.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

This invention includes a hardware configuration and a relationship for calculating the grade of uranium (or other fissile material, such as certain isotopes of plutonium) from data collected with the hardware.

Figure 1:
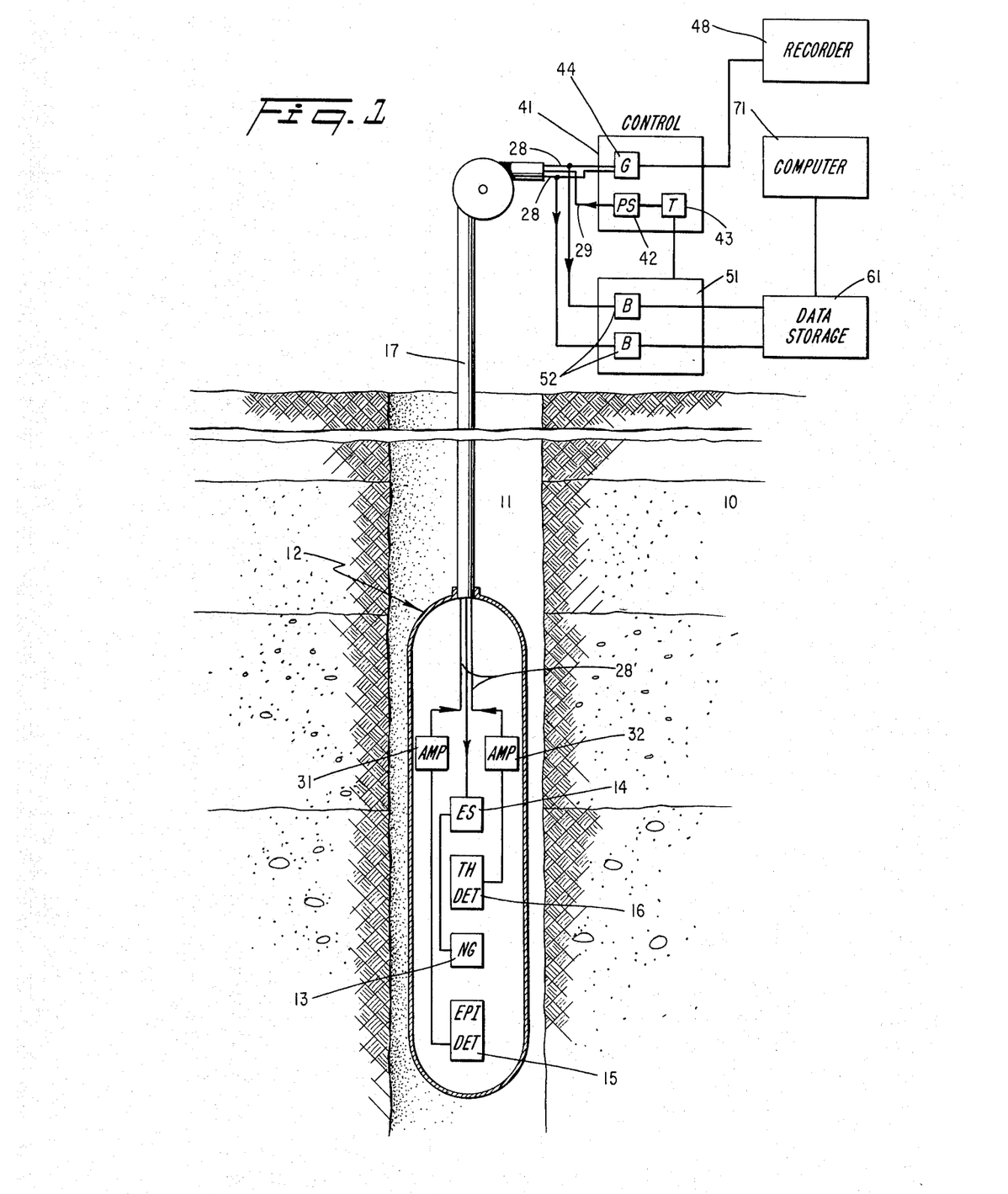
FIG. 1 shows a block diagram of the hardware of the invention.

FIG. 1 shows the hardware through which this invention allows the in situ investigation and assaying of uranium mineralizations (10) in earth formations which have been traversed by a borehole (11). A probe (12) is lowered down the borehole on a logging cable (17). The components of the probe include a neutron generator (13) comprising a Penning-discharge ion source, an ion-source control circuit, an accelerating section, and a high voltage pulse transformer. An accelerating voltage of 100 kV to 130 kV is obtained from the pulse transformer by means of a pulse generating energy storage circuit (14). This latter circuit converts the input voltage of 500 V to approximately 1,000 V and pulses this stored energy to the transformer in response to a trigger signal from the uphole control équipment. The neutron generator produces neutrons of approximately 14 MeV energy by the D-T and T-D nuclear reactions. Neutron bursts are approximately 10 microseconds in duration and produce $10^6$ neutrons per pulse.

To detect prompt fission neutrons in the epithermal energy range, a cadmium-wrapped $^3$He-filled proportional counter (15) is used. Reuter-Stokes, Inc. is one commercial manufacturer of this device. To prevent overloading of the detector during the source neutron burst, the bias voltage is held at a value below the proportional multiplication level of the detector. Since the response to the source pulse is dissipated in about 200 microseconds after the burst, the bias voltage is increased to its proper level at the end of the 200 microsecond period, so the detector is available to collect valid counts. The detector is biased for counting until 2,500 microseconds after the source burst.

The dieaway of the thermal neutron flux in the formation may be monitored by the gamma rays produced from the $^{28}Si(n,\gamma)$ reaction. This reaction produces gamma rays in the energy range 3.5 MeV to 5.5 MeV from the absorption of thermalized source neutrons. Other gamma rays may be produced by absorption reactions with other formation elements. The thermal neutron detector (16) is a NaI crystal directly coupled to a photomultiplier tube and is a commercially available product of Bicon Corporation. By using a 3.3 MeV threshold on the thermal neutron detector circuit, the 2.2 MeV gammas from hydrogen in water can be rejected. Because silicon is the dominant component of most earth formations, other elements which produce gamma rays above 3.3 MeV will not result in significant spurious signals to affect the results.

Streams of pulses representative of detected neutrons are sent from the detector amplifier circuits (31 and 32) up conductors (28) of the logging cable (17).

Surface equipment includes control module (41), data acquisition module (51), and the data storage device (61). The control module includes power (42), timing (43) and signal conditioning/observation (44) modules. The 500 V power to the downhole probe is supplied through a conductor (29) by a regulated power supply (42), set at a value which compensates for the losses in the logging cable. Timing module (43) is a 1 to 100 pulse per second variable rate pulse generator that triggers the neutron generator and the data acquisition module. The two signal pulse streams from downhole are passed unaltered into the data acquisition input, but they are gated by module (44) to remove early-time noise for display on the uphole recorder (48) to provide an on-site indication that data is being properly received.

Data acquisition is done by means of a Nuclear Data Model ND-100 Multichannel Analyzer (MCA) or equivalent (51), operated in the multiscaling (MCS) mode. Data input is handled by two zero-dead-time buffers (52) of the MCA. This system allows both the epithermal and thermal signals to be accumulated on a time-resolved basis and to be transferred through the MCA to the data storage device (61). Functionally, the buffers each consist of two counters with a switching circuit on the input. While data are being accumulated in one counter, the other is dumping to the buffer memory. The "zero-dead-time" feature means, effectively, that no data are lost, because the switching time from one counter to the other occurs in about 10 nanoseconds. Data are accumulated in one of the buffer counters for the length of an MCS dwell time and are then dumped into a single buffer channel. The second counter meanwhile has begun accumulating data which it dumps into the adjacent buffer channel at the end of the next dwell time. Dwell times are switch-selectable. Currently, data are accumulated for 50 microseconds per channel, and the buffer memory is partitioned into 64 channels for the epithermal and the thermal signals, giving a possible analysis window of 3,200 microseconds. As discussed hereinafter, the actual window utilized in the measurement is only a portion of the interval. After all buffer channels have been addressed, the next neutron pulse starts the procedure again. Counts are accumulated in each channel for each neutron pulse that occurs over the data acquisition time.

On receipt of a "data dump" signal, the buffer memory is dumped through the MCA onto the data storage device and is reset. Additional factors pertaining to the data are added to the record which was accumulated. A serial number (called the tagword) is added to identify the particular 20 second period over which data were collected. In addition, time of day, date and identifier (such as borehole identification, PFN probe number, etc.) are recorded. The entire record, consisting of the header information, the epithermal data and the thermal data is then written onto magnetic tape (61) for analysis by either an on-site computer or a central computer (71).

By varying such parameters as neutron generator pulse rate and detector gate periods, the aforementioned equipments, some of which are described in more detail in the aforementioned SAND77-0300, can make practically all PFN measurements including the direct measurement of Czubek and the epithermal to thermal (counts ratio) measurements of Renkin, Givens and Mills. However, to improve the accuracy of the measurement, means to interpret the data have been developed in accordance with the invention.

Figure 2:
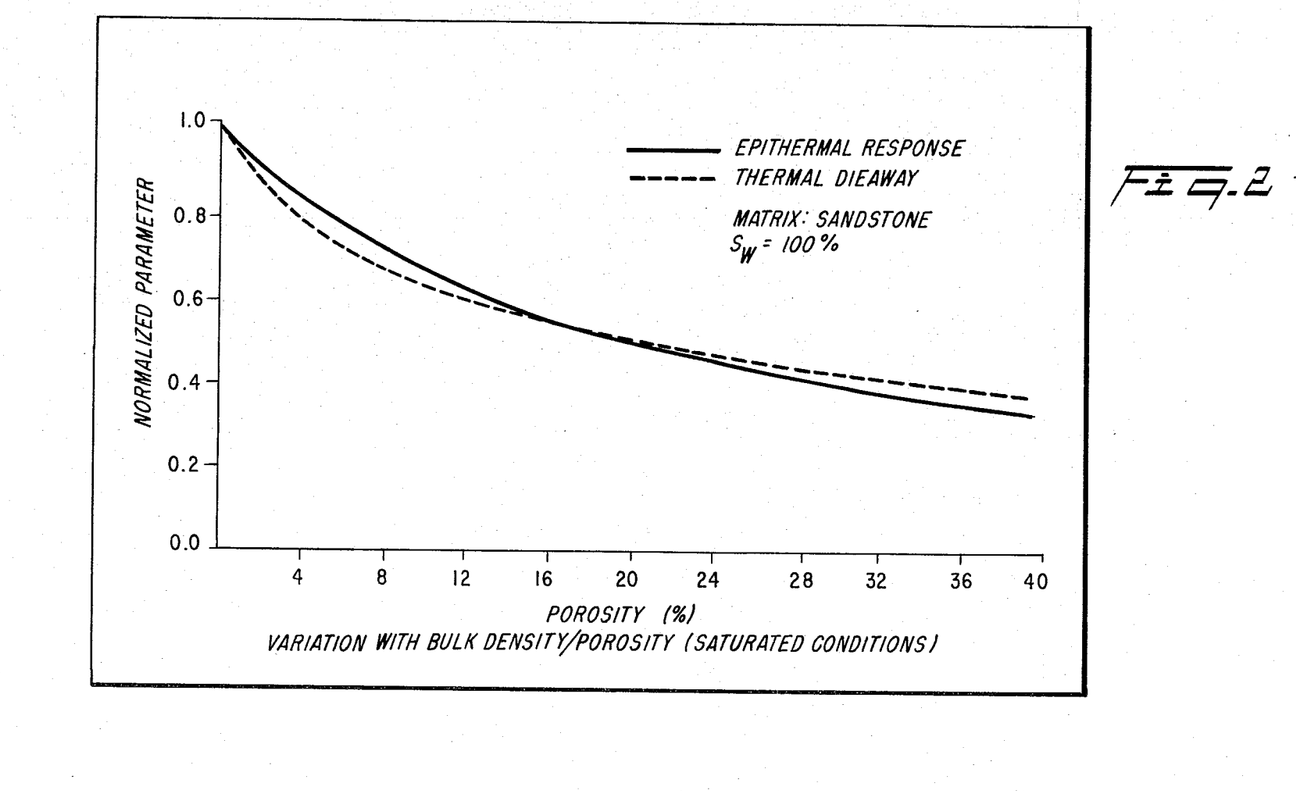
FIG. 2 shows the variation with porosity of epithermal counts and thermal dieaway.

The basis for this invention was empirically derived and verified by computer calculations as depicted in FIG. 2. The epithermal response (i.e., integrated epithermal counts) and thermal dieaway time have both been separately normalized at zero porosity in this Figure. Both responses track over a wide range of porosity in the formation. Consequently, for constant uranium concentration, the ratio of epithermal counts ($C_\epsilon$) to thermal dieaway ($\tau_\theta$) is approximately constant over the porosity range. Whereas variations in $C_\epsilon$ may be due to a number of factors, changes in the ratio $C_\epsilon/T_{74}$ are limited largely to changes in uranium content. The counts/dieaway model can be related to the product $R\Sigma_A$, terms in the Czubek expression given previously. In order to normalize the model to proper neutron flux, the neutron generator output is used explicitly. The counts/dieaway model has been calibrated at USDOE Fission Neutron Model test pits at Grand Junction and has demonstrated much better field data than has the counts ratio model.

Figure 3:
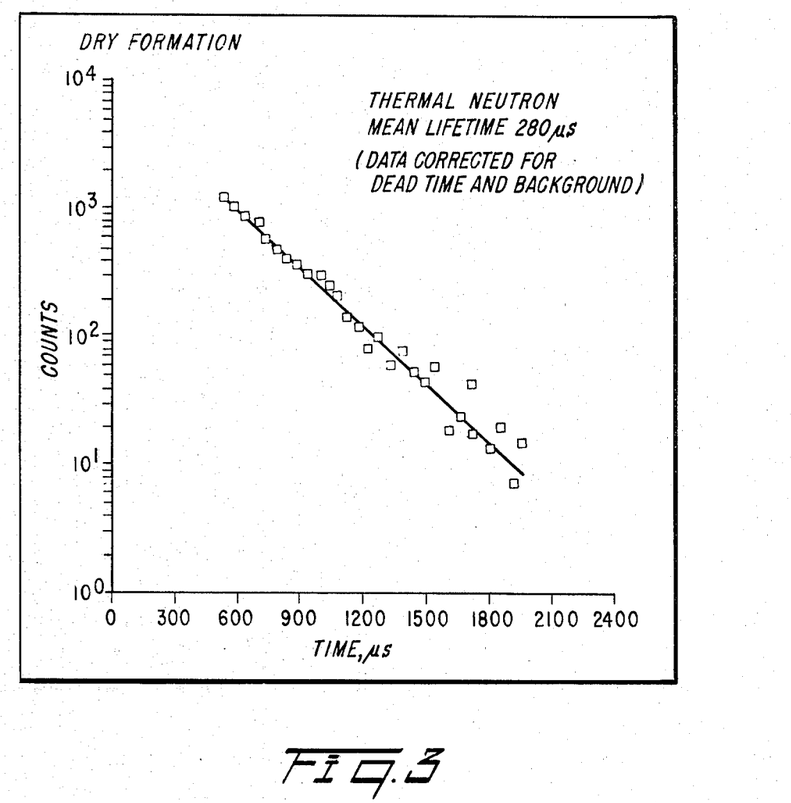
FIG. 3 shows counts recorded during a logging interval.

As discussed in conjunction with FIG. 1, data from the PFN probe are collected and stored in a counts-vs-time format. Each data record contains the time-resolved epithermal and thermal counts, representing accumulated counts over the data acquisition interval. This interval (called the data pump time) is preset according to the depth traveled by the probe while logging. For a typical travel distance of 0.15 meters at a logging speed of 0.5 m/min, the acquisition time is about 20 seconds. FIG. 3 shows a typical measurement where each data square represents the total number of thermal counts recorded in a 50 $\mu$s data channel for all neutron bursts which occur during the 20 second period.

Typical uranium deposits provide average pulse rates of the order of ten per second for epithermals and 75 per second for thermals. Peak rates are typically 100 counts per second for the epithermals and 150 cps for the thermals. If neutron generator (13) provides 100 pulses per second, the maximum number of counts per pulse is about 1.5 per channel. Counts are typically measured over a 20 second interval during which probe (12) has moved approximately 6 inches.

Data are sent uphole over the logging cable as pulse streams. Since strandard 4HO logging cable has twisted conductors of high electrical resistance, its transmission properties are not very satisfactory. The effect of poor transmission characteristics is to stretch pulses and increase dead time. Additionally, the downhole detector circuits also have inherent resolving times which provide a limit for the minimum detectable pulse. Measurements on various models of the PFN probes have shown resolving times of the order of 7-15 microseconds, measured uphole at the inputs to the data acquisition instrumentation.

The formula by which counts in a data channel are corrected for system dead time is a modification of the standard relationship $n'=n/(1-nt)$, where $n'$ is the corrected count, n is the observed count, and t is the resolving time. The modifications to the formula reflect the repetitive nature of data acquisition by including a term which describes the actual data acquisition procedure. Since data are collected for "$T_{DD}$" seconds, the length of the data dump interval, and there are 100 acquisition periods per second, each of 50 microseconds duration, the term nt is reduced by the factor $50*100*T_{Dd}$. Thus, the dead time correction is $n'=n/(1-nt/5000*T_{DD})$.

Because of the poor transmission qualities of the 4HO cable, pulse rates greater than 30 kHz cannot reliably the acquired uphole. A 30 kHz pulse rate means 0.03 pulses per microsecond, or 1.5 pulses per 50 microsecond data channel. For a neutron generator rate of 100 bursts per second, the count limit per channel per second is 150. This criterion is used to reject data channels with high count rates. Therefore, the computer that compiles counts vs. time data is programmed by conventional techniques to utilize data channels having total counts less than approximately 3,000 (150 counts/sec×20 seconds) to determine the dieaway as discussed hereinafter, and then to use the dieaway, which is the slope of the data, to compute a corrected data count for data intervals along the slope.

The correction for poor transmission quality may also be overcome by using high-frequency-response cable. Such cable has a higher count-rate limit, so the correct count may be measured over the entire time.

The analysis window is taken to extend from the starting channel to the channel where the conditioned data first are zero. For thermal neutrons, the start channel is 550 microseconds after the burst, and the end channel is about 1,250 microseconds. For epithermal neutrons, the start channel is 350 microseconds and the end channel is at about 1,250 microseconds.

As noted above, the dieaway is the slope of the counts vs. time curve shown in FIG. 3. The conditioned data are used to fit an exponential to describe the dieaway by conventional techniques such as a variance minimization algorithm. The function fitted is $$\epsilon = \Sigma(y(i) - A\exp(-Bt(i)))^2/y(i).$$

The numerator is proportional to the variance of the fit to the data, while the denominator is a weighting factor used to assure that the variances are the same for all values of the independent variable (t). Assuming Poisson-distributed data, the weighting is the standard deviation $\sqrt{y}$; thus, minimizing $(\epsilon/\sigma)^2 = ((y-A\exp Bt)/\sqrt{y})^2$ gives the above equation. The fitting parameter B is the inverse of the mean lifetime, or dieaway, of the distribution.

Since the flux of epithermal neutrons is directly proportional to the flux of thermal neutrons from the burst, the slope of epithermal and themal curves is identical, and dieaway may be determined from either. However, as there are more thermal neutrons than epithermal neutrons, the measurement is most easily made from thermal neutron count.

The total number of counts, $C_\epsilon$, is found by summing the actual counts in the analysis window. Comparisons are made with the "fitted integral," the equivalent number of counts calculated by using the exponential formula over the analysis window. When channels have been rejected due to too high a count rate, the fitted integral is used instead of the actual sum of counts.

The counts/dieaway model is given by the relationship $$g = S(C_\epsilon/T_\theta)/(Q*T_{DD}*DF(D,w)*\rho_d).$$

The thermal dieaway, $\epsilon_{74}$, is calculated as outlined above, and the terms Q and $T_{DD}$ provide normalization for the neutron generator output. DF(D,W) is the diameter correction factor while $\rho_d$ is the density of the dry (solid) formation components.

To normalize the model to account for varying numbers of neutrons irradiating the formation, the epithermal response is divided by an estimation of the neutron output Q. The output of the neutron generator, in neutrons per second, is determined by placing a neutron detector in the vicinity of the generator under test and applying conventional measurement techniques. This number is considered to be a constant for the duration of the log. Since data dumps are triggered on depth, the length of the data dump interval $T_{DD}$ is also a factor in calculating the number of irradiating neutrons.

Data for the formation density and diameter calculations are obtained with a commercial gamma-gamma (gamma backscatter) and caliper logging probe. A typical probe which may be used for this measurement is the Comprobe model 2104. The caliper measurement utilizes a one-arm system in conjunction with the density measurement. The latter uses two detectors at different spacings from the gamma source to allow for compensation for borehole effects.

The caliper device has a spring-loaded arm which translates extension into a signal which can be expressed as a diameter, after calibrating the arm extension with suitable standards. The arm also serves to force the probe against one sidewall for the gamma-gamma measurements.

The gamma-gamma portion of the probe consists of a $^{137}Cs$ source of gamma rays and two detectors spaced different distances from the source. The purpose of the dual spacing is to use the fact that the near-spaced detector is more sensitive to backscatter from nearby formation volumes, while the far-spaced detector responds to a bigger volume. Consequently, information from the near-spaced detector can be used to compensate for extraneous signals (such as mudcake) in the total signal of the far-spaced detector. In like manner, the natural gamma detector provides a signal which can be used to remove gamma ray background. There is a large distance between the natural gamma detector and the density detectors, on order to isolate the natural gamma detector from the density gamma source. Data accumulation is done in similar fashion to PFN, so there is a depth associated with each data dump, and each channel of the data record represents values at a specific depth.

If gamma-gamma and caliper data have been collected, borehole diameter and "compensated" density are calculated for the formation. The "compensation" aspect of the density calculation is a correction for borehole diameter, the presence of mudcake on the borehole wall, and for natural gamma background in the formation. The theory for this calculation was presented in a paper by J. H. Scott, SPWLWA 18th Annual Logging Symposium, June 1977.

Figure 6:
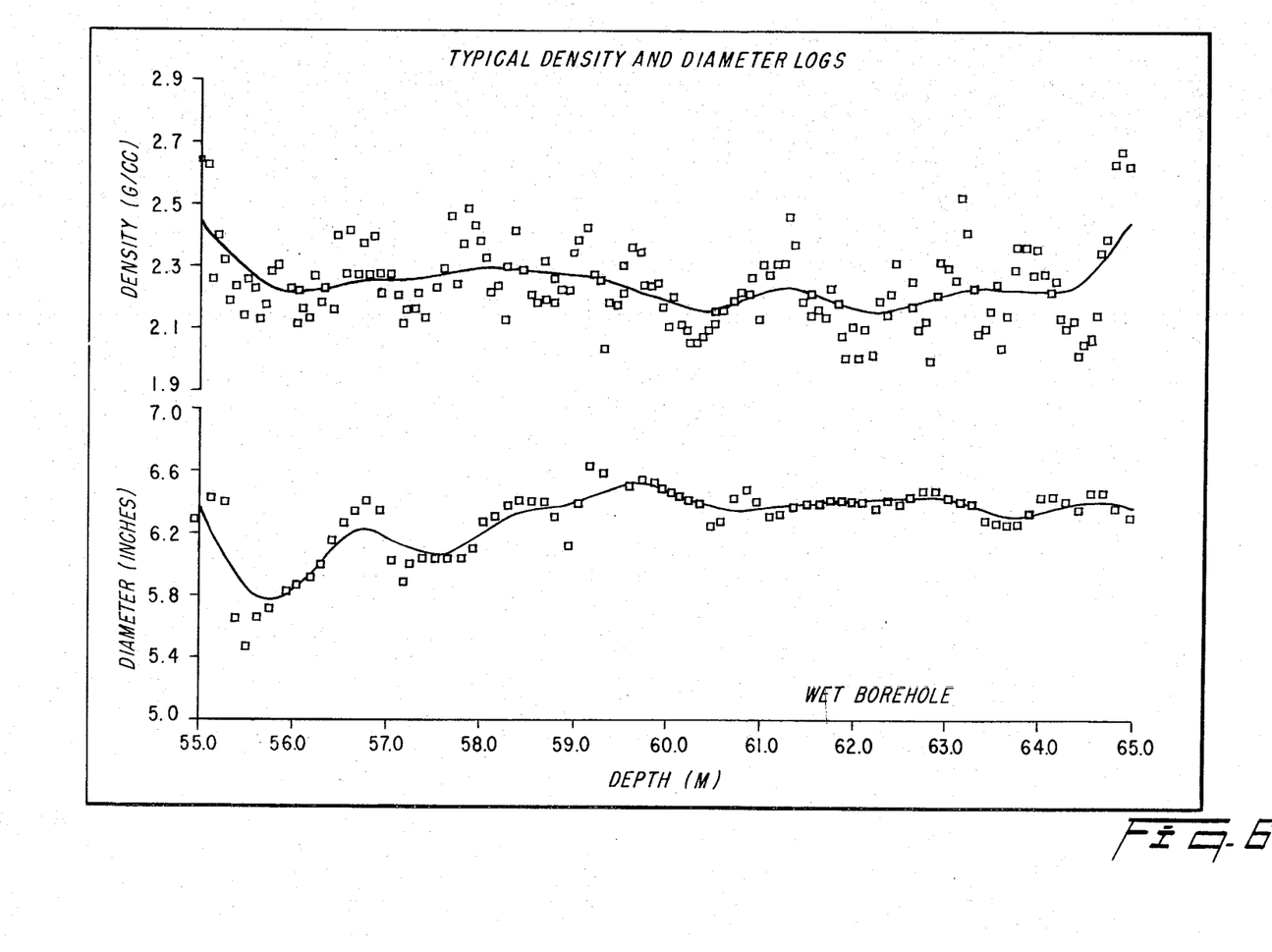
FIG. 6 shows data and smoothing of diameter and density measurements.

Because diameter and density data fluctuate as shown in FIG. 6, a smoothing routine is used to make the data more tractable. Smoothing is done with a conventional technique such as a cubic spline fit in which the goodness-of-fit to each point is controlled by a weighting factor.

Figure 4:
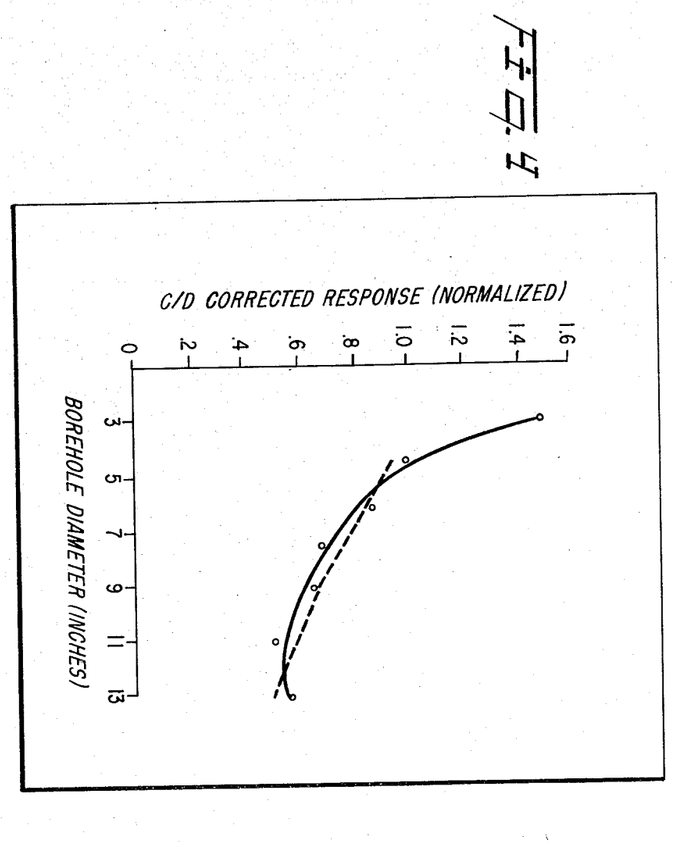
FIG. 4 shows the diameter correction factor for a waterfilled borehole.
Figure 5:
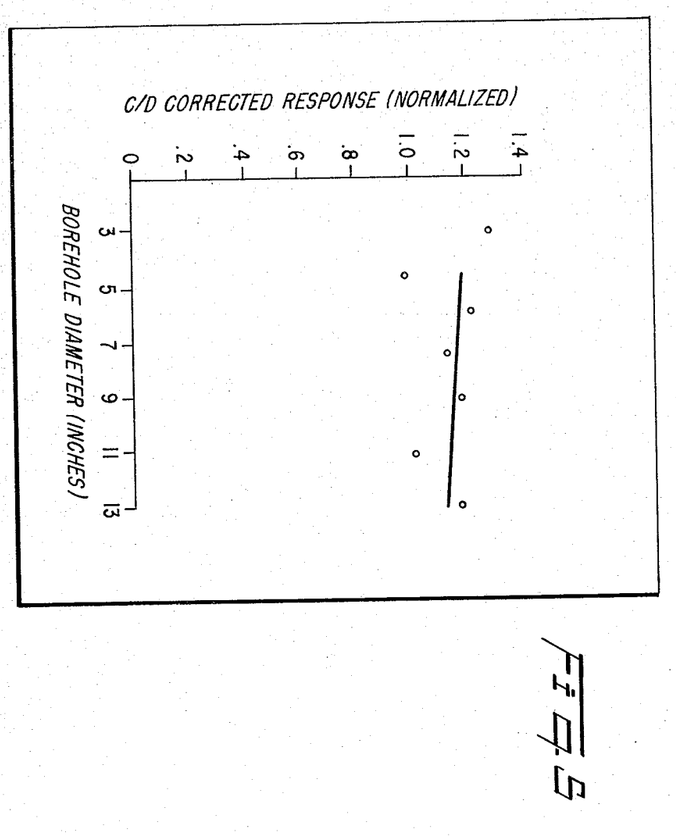
FIG. 5 shows the diameter correction factor for an airfilled borehole.

The diameter correction factor is empirically derived from test pit data. The PFN responses for wet and dry holes for a 2.5 inch diameter probe are shown in FIGS. 4 and 5, normalized to a 4.5 inch borehole. In general, there was a much greater change in response in water-filled holes than in dry ones. At the largest borehole diameter there was also a significant spread in response depending on whether the probe was centered or not. The Figures indicate the correction when the probe touches the borehole side, the typical situation in the field.

By conventional mathematical analysis, wet-hole data were fitted best by a cubic spline, while dry-hole data were fitted by a linear function. Cubic spline techniques are a common statistical method, one example of which is explained in *Elementary Numerical Analysis: An Algorithmic Approach* by Conte, et al. FIG. 6 shows smoothing of typical diameter and density data. For ease of analysis, an exponential fit of the form $DF = e^{-(A*diameter)}$ has been used for the wet data. The solid curve in FIG. 4 is the spline fit, while the dashed line is an exponential fit to the values estimated by the spline fit. For borehole diameters between 4.5 inches and 11 inches, the exponential fairly accurately estimates the data. Although the greatest discrepancy is for the 3 inch borehole, holes this size are smaller than the PFN probe can safely log, and would ordinarily not be used.

As indicated by thwe formula, the PFN data and diameter-density data are both used in the uranium grade calculation either using average values for the diameter and bulk density, or by merging individual PFN data with diameter and density data measured at the same depth, thereby calculating the grade on a point-by-point basis. Output of these codes is conveniently presentable in the form of listings of grade-vs-depth, or plots of the same.

Grades may be calculated for each point for which PFN data have been taken. The result is an estimate of the grade averaged over 15 cm intervals. The volume from which the PFN signal is detected varies with formation properties, but is a sphere of approximately 60 cm diameter. The grade-thickness product above a specified cutoff may also be calculated. Grade-vs-depth plots are more informative for showing uranium distribution, but the grade-thickness product is often a better measure of agreement with chemical core assays or of economic uranium content.

As was outlined previously, grade estimation models are calibrated against test pit data by postulating a model and calculating a calibration scale factor S. As an example of this procedure, such a postulated model could be the ratio of epithermal counts to thermal dieaway with an exponential form for the diameter correction factor. The components used to construct a model consist of parameters for which actual values are known (i.e., the borehole diameter, bulk density and grain density, and water saturation, data dump time, etc.), and functions which have been normalized. The various correction factors are expressed in terms of certain "standard" values. Diameters are normalized to 4.5 inches (the standard-diameter borehole used by DOE); the formation correction factor is normalized to 0 porosity (i.e., a bulk density of 2.65 for sandstone), and 100 percent water saturation. Thus, the correction components $$I/(Q*T_{DD}*DF(D,w)*\rho_d)$$

include the normalized function DF whose argument is the actual diameter. The entire model therefore remains uncalibrated without the scale factor S.

Figure 7:
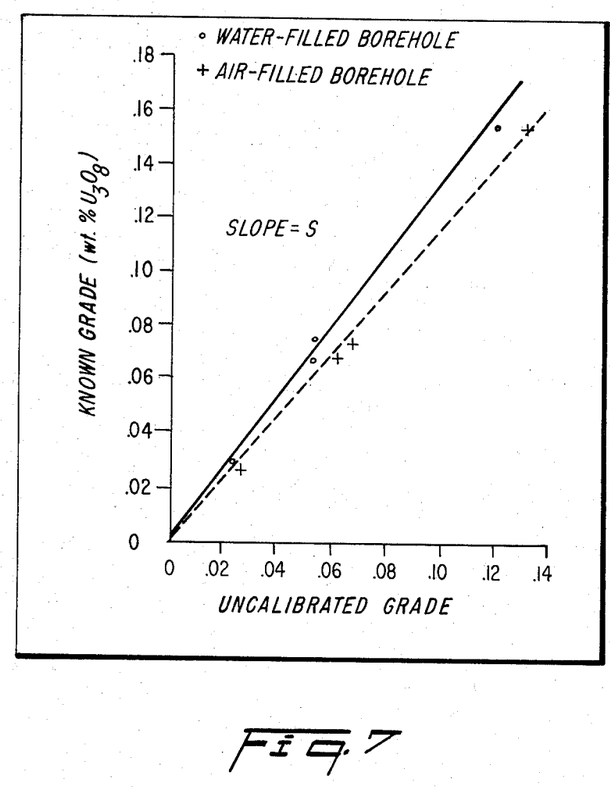
FIG. 7 shows the determination of the calibration factor S.

The Grand Junction Fission Neutron Model test pits at Grand Junction, Colorado, are concrete structures with various uranium grades (A-Model Pits 1-4), or with various density, porosity, or absorption properties and approximately the same uranium grade (A-Model Pits 5 and 6), or with various borehole diameters (the D-Model Pit). The fluid saturation in the concrete has been determined to be 90 percent. Using these density, saturation and borehole diameter data, a grade estimate for each Model borehole can be determined. The estimated grades for each test pit are compared with the reported values to produce a difference function. The slope of this function is the calibration scale factor. The calibration scale factor may then be graphically or analytically determined. As an example of such a calibration, the plot for the counts/dieaway model in wet or dry boreholes is given in FIG. 7.

The particular sizes and equipments discussed above are cited merely to illustrate a particular embodiment of the invention. It is contemplated that use of this invention may involve different equipments and techniques as long as the principal of logging uranium with a ratio of epithermal counts to epithermal or thermal dieaway is followed. It is intended that the scope of the invention be defined by the claims appended hereto.

We claim:
1. A neutron logging method for assaying uranium formations traversed by a borehole comprising:
 (a) obtaining at a plurality of logging points borehole log data defining prompt fission neutron counts and thermal neutron counts;
 (b) determining the dieaway of either said prompt fission neutron counts or said thermal neutron counts at each logging point; and
 (c) producing uranium assay information at each logging point from the ratio of said prompt fission neutron count to said dieaway.

2. The method of claim 1 including the additional steps of:
 (d) obtaining at said plurality of logging points a second set of borehole log data defining physical characteristics of said borehole and said formation;
 (e) wherein said uranium assay information is produced from said ratio and said second set of log data.

3. The method of claim 2 wherein said borehole log data is obtained by generating a burst of 14 MeV neutrons which decay to thermal energy levels and detecting epithermal prompt fission neutrons emitted by uranium interacting with said thermal neutrons.

4. The method of claim 3 including the additional step of:
 determining a calibration of the output of said neutron generator; wherein said uranium assay information is produced from said ratio, said second set of log data and said calibration value.

* * * * *